United States Patent
Ohkubo et al.

(10) Patent No.: US 8,246,104 B2
(45) Date of Patent: Aug. 21, 2012

(54) VEHICULAR REINFORCING BAR STRUCTURE

(75) Inventors: Hiroshi Ohkubo, Wako (JP); Eiji Yamada, Wako (JP); Kengo Ishibashi, Wako (JP); Kiyohito Koizumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 259 days.

(21) Appl. No.: 12/759,778

(22) Filed: Apr. 14, 2010

(65) Prior Publication Data

US 2010/0264701 A1  Oct. 21, 2010

(30) Foreign Application Priority Data

Apr. 15, 2009  (JP) .................................. 2009-099192

(51) Int. Cl.
 *B62D 25/08* (2006.01)
 *B62D 25/20* (2006.01)
(52) U.S. Cl. .......... 296/187.08; 296/193.02; 296/193.07
(58) Field of Classification Search .................... 296/29, 296/30, 40, 187.01, 187.08, 187.11, 187.12, 296/193.02, 193.07, 193.08, 203.01, 203.03, 296/203.04, 204, 205
See application file for complete search history.

(56) References Cited

U.S. PATENT DOCUMENTS

| | | | | |
|---|---|---|---|---|
| 2,669,462 A | * | 2/1954 | Toncray et al. | 280/785 |
| 4,613,184 A | * | 9/1986 | Rispeter et al. | 296/203.01 |
| 4,887,862 A | * | 12/1989 | Bassi | 296/204 |
| 6,145,922 A | * | 11/2000 | Shirahama et al. | 296/193.02 |
| 6,932,405 B2 | * | 8/2005 | Nakagawa et al. | 296/29 |
| 7,201,398 B1 | * | 4/2007 | Christofaro et al. | 280/781 |
| 7,490,892 B2 | * | 2/2009 | Sato | 296/184.1 |
| 7,513,329 B2 | * | 4/2009 | Nakashima et al. | 180/312 |
| 7,661,744 B2 | * | 2/2010 | Maruno et al. | 296/65.16 |
| 7,731,274 B2 | * | 6/2010 | Kishima et al. | 296/203.03 |
| 7,784,858 B2 | * | 8/2010 | Abe et al. | 296/203.04 |
| 7,905,541 B2 | * | 3/2011 | Yamaguchi et al. | 296/203.04 |
| 8,070,217 B2 | * | 12/2011 | Matsuura et al. | 296/203.04 |
| 2011/0133519 A1 | * | 6/2011 | Caliskan et al. | 296/204 |
| 2011/0198890 A1 | * | 8/2011 | Peschansky | 296/205 |

FOREIGN PATENT DOCUMENTS

| | | |
|---|---|---|
| JP | 07-19954 | 5/1995 |
| JP | 2003-118650 | 4/2003 |
| JP | 2004-284576 | 10/2004 |
| JP | 2005-153798 | 6/2005 |
| JP | 2008-207676 | 9/2008 |

\* cited by examiner

*Primary Examiner* — Glenn Dayoan
*Assistant Examiner* — Paul Chenevert
(74) *Attorney, Agent, or Firm* — Rankin, Hill & Clark LLP

(57) ABSTRACT

A vehicular reinforcing bar structure includes: a reinforcing bar fixedly fastened at its opposite end portions to a pair of opposed vehicle body frame members, the reinforcing bar having a uniform closed sectional shape from one of the end portions to the other; collars fitted in the respective opposite end portions of the reinforcing bar for imparting fastening force to the end portions; and mounting brackets provided in corresponding relation to the opposite end portions, each of the mounting brackets being formed in a closed section and fixedly fastening the corresponding end portion by sandwiching the end portion with the corresponding vehicle body frame member.

5 Claims, 7 Drawing Sheets

US 8,246,104 B2

VEHICULAR REINFORCING BAR STRUCTURE

FIELD OF THE INVENTION

The present invention relates to vehicular reinforcing bar structures including a reinforcing bar provided between left and right rear side portions of a vehicle.

BACKGROUND OF THE INVENTION

Vehicular reinforcing bar structures are known where a reinforcing bar (or cross beam) is fixedly fastened at opposite end portions thereof to left and right rear side frames (i.e., vehicle body frame members), extending in a front-rear direction of the vehicle near left and right wheels of the vehicle, to thereby enhance a mechanical strength of a rear section of the vehicle. One example of such vehicular reinforcing bar structures is disclosed in Japanese Patent No. 3670233.

According to the disclosure of the No. 3670233 patent, the reinforcing bar (cross beam) is a pipe-shaped member having flattened mounting portions at its longitudinally opposite end portions, and the reinforcing bar is fixedly fastened at the flattened end portions (mounting portions) to the left and right rear side frames (i.e., vehicle body frame 21) members). However, with the disclosed vehicular reinforcing bar structure, there is a need to enhance a load transmitting efficiency at the end portions (mounting portions).

SUMMARY OF THE INVENTION

In view of the foregoing prior art problems, it is an object of the present invention to provide an improved vehicular reinforcing bar structure which can achieve an enhanced load transmitting efficiency at opposite end portions of the reinforcing bar fixedly fastened to vehicle body frame members and allows vertical and horizontal dimensions of a section of each of the opposite end portions to be freely changed.

In order to accomplish the above-mentioned object, the present invention provides an improved vehicular reinforcing bar structure, which comprises: a reinforcing bar fixedly fastened at opposite end portions thereof to corresponding ones of a pair of opposed vehicle body frame members, the reinforcing bar having an uniform closed section, i.e., uniform closed sectional shape, from one of the end portions to the other; and collars fitted in respective ones of the opposite end portions of the reinforcing bar for imparting fastening force to the respective end portions. By the provision of the collars, the 1) reinforcing bar is fixedly fastened to the opposed vehicle body frame members with each of the opposite end portions maintained in the closed sectional shape, so that the present invention can achieve an enhanced load transmitting efficiency at the opposite end portions of the reinforcing bar. Preferably, each of the collars is inserted through a hole formed in an upper wall portion of the reinforcing bar and fixedly joined at a lower end portion thereof to a region of a lower wall portion of the reinforcing bar.

Preferably, the closed sectional shape of the reinforcing bar is a rectangular closed sectional shape. Because of the rectangular closed sectional shape, it is possible to freely change vertical and horizontal dimensions (vertical-to-horizontal ratio) of the section of each of the opposite end portions as needed according to target performance of the reinforcing bar structure.

Preferably, the vehicular reinforcing bar structure further comprises mounting brackets provided in corresponding relation to the opposite end portions of the reinforcing bar, each of the mounting brackets being formed in a closed section (closed sectional shape) and fixedly fastening the corresponding end portion by sandwiching the end portion with the corresponding vehicle body frame member. With the mounting brackets each formed in a closed section, the opposite end portions of the reinforcing bar can be fixedly fastened to the vehicle body frame members with an increased strength, so that a load transmitting efficiency at the opposite end portions can be even further enhanced.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
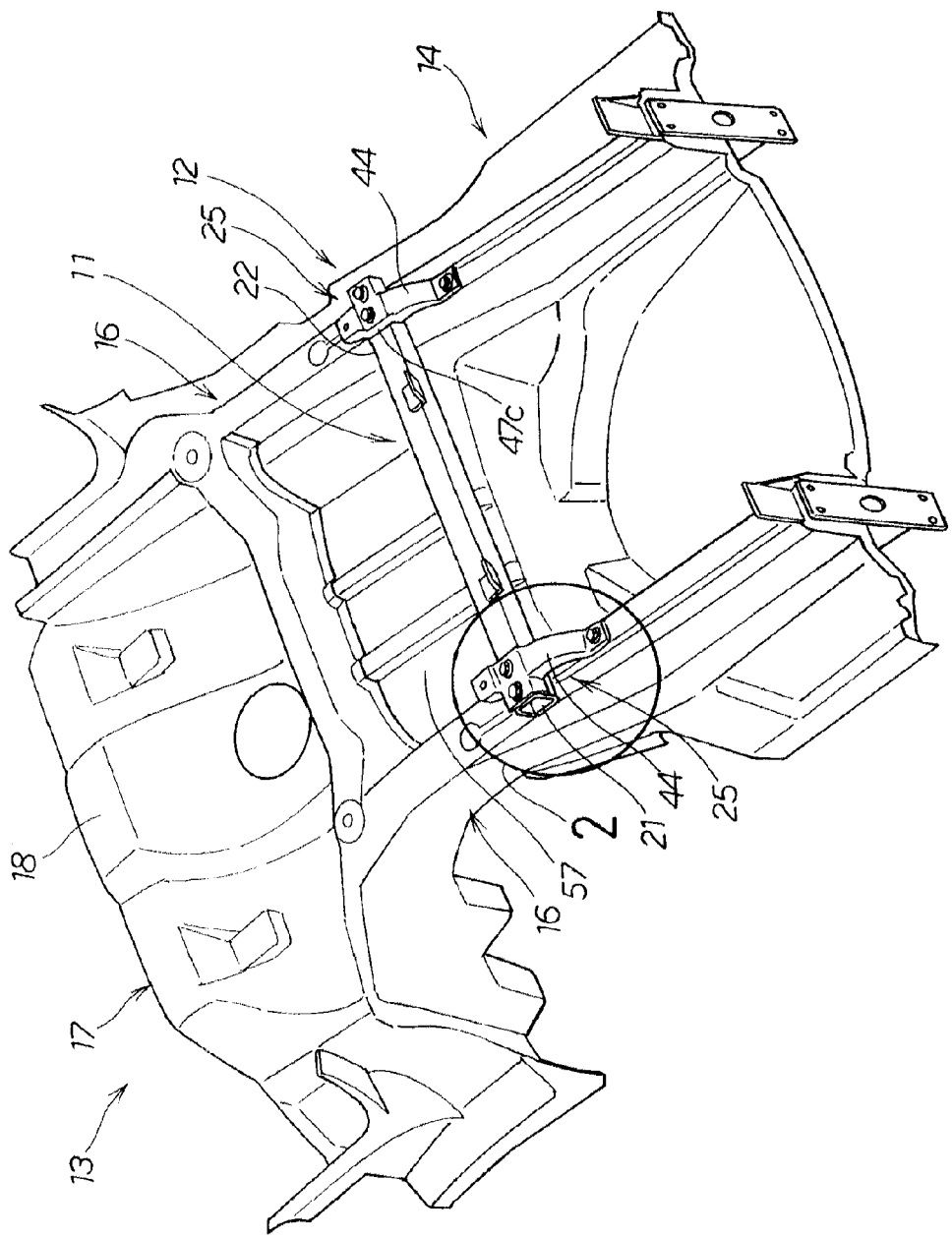
FIG. 1 a first embodiment of a vehicular reinforcing bar structure of the present invention.

Initial reference is made to FIG. 1 showing a first embodiment of a vehicular reinforcing bar structure 12. As shown in FIG. 1, the vehicular reinforcing bar structure 12 is employed in a rear section 14 of a vehicle 13 for enhancing a strength of the rear section 14 with a pipe-shaped reinforcing bar (cross beam) 11 fixedly fastened to rear side frames 16 in a manner detailed below.

The vehicle 13 includes a vehicle body 17, the left and right rear side frames 16, a rear floor panel 18 and the reinforcing bar structure 12.

Now, with reference to FIGS. 1-4, a detailed description will be given about the vehicular reinforcing bar structure 12 and other relevant components. The vehicular reinforcing bar structure 12 is fixed at one end portion 21 to the left rear side frame 16 and at the other end portion 22 to the right rear side frame 16. The left and right rear side frames 16 constitute vehicle body frame members. The reinforcing bar 11 is formed in a uniform closed section (i.e., uniform dosed sectional shape) throughout its length, i.e. from the one end portion 21 to the other end portion 22. A collar 24 is fitted within the one end portion 21 for imparting fastening force to the end portion 21, and another collar 24 is fitted within the one end portion 22 for imparting fastening force to the other end portion 22.

The vehicular reinforcing bar structure 12 includes left and right hook-shaped mounting brackets 25 each formed in a closed section (closed sectional shape). The opposite end portions 21 and 22 are fixedly fastened by being sandwiched between the left and right hook mounting brackets 25 and the left and right rear side frames 16 that are vehicle body frame members.

More specifically, the reinforcing bar 11, which is characterized by having a rectangular closed section (rectangular closed sectional shape), integrally includes: a first or lower wall portion 31 held in overlappingly contact with the rear side frames 16; a second or upper wall portion 32 opposed to the first side portion 31; a third wall portion 33 extending at right angles to the first and second wall portions 31 and 32 to connect between the first and second wall portions 31 and 32; and a fourth wall portion 34 opposed to the third wall portion 33. The one end portion 21 is a first fastened portion fixedly joined to one of the hook mounting brackets 25 via a welding bead portion 36, while the other end portion 22 is a second fastened portion joined to the other hook mounting bracket 25 via a welding bead portion 37 similar to the welding bead portion 36.

As viewed in a side view of the vehicle 13 (FIG. 3), the reinforcing bar 11 has a vertical-to-horizontal ratio (height/width) of equal to or less than 1, such as 0.5. More specifically, the first or lower wall portion 31 extending in a horizontal or front-rear direction of the vehicle has a width (horizontal dimension) W1, and the third wall portion 33 extending in a vertical or up-down of the vehicle has a height (vertical dimension) H1 smaller than the width W1.

Figure 3:
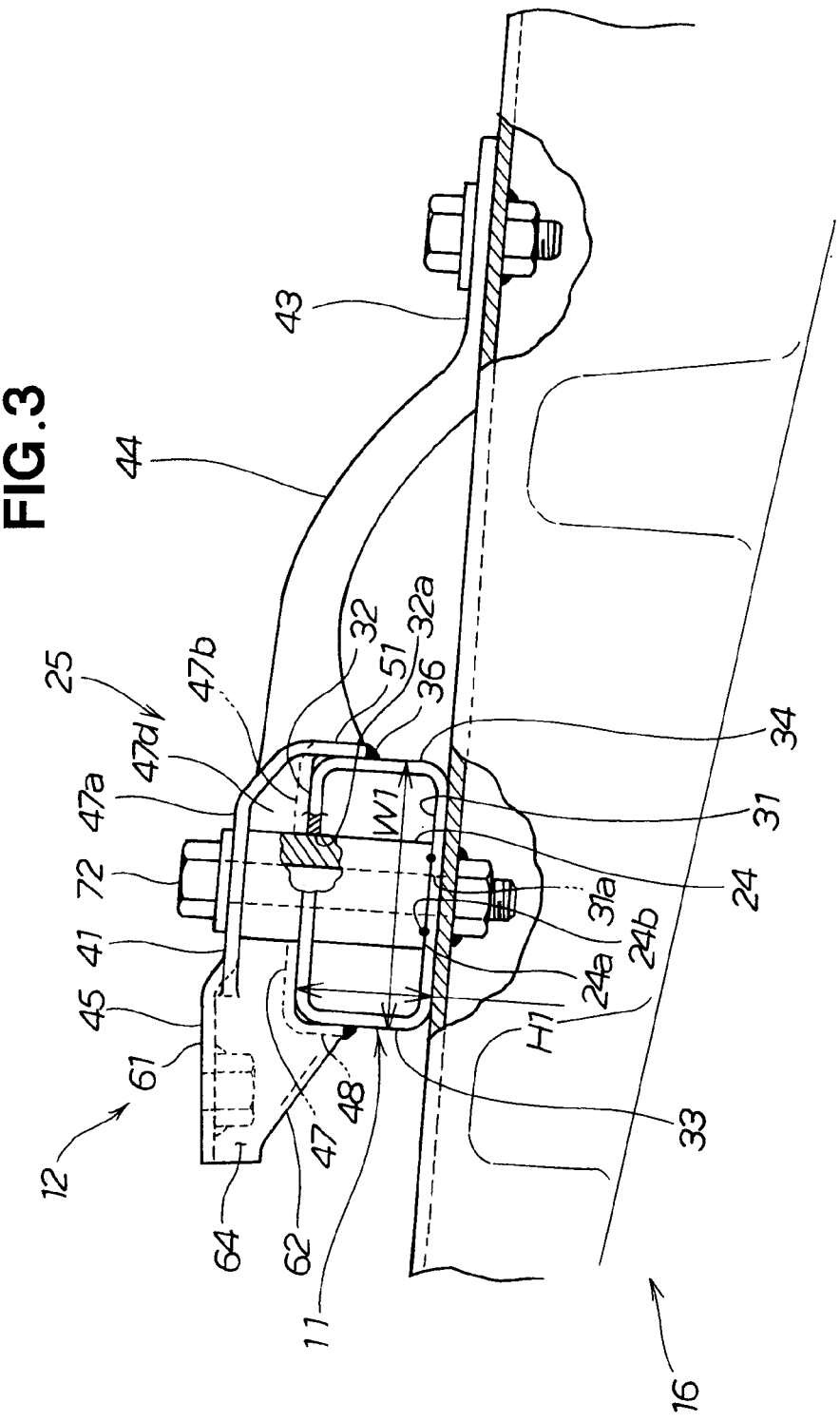
FIG. 3 is a view taken in a direction of arrow 3 of FIG. 2.
Figure 4:
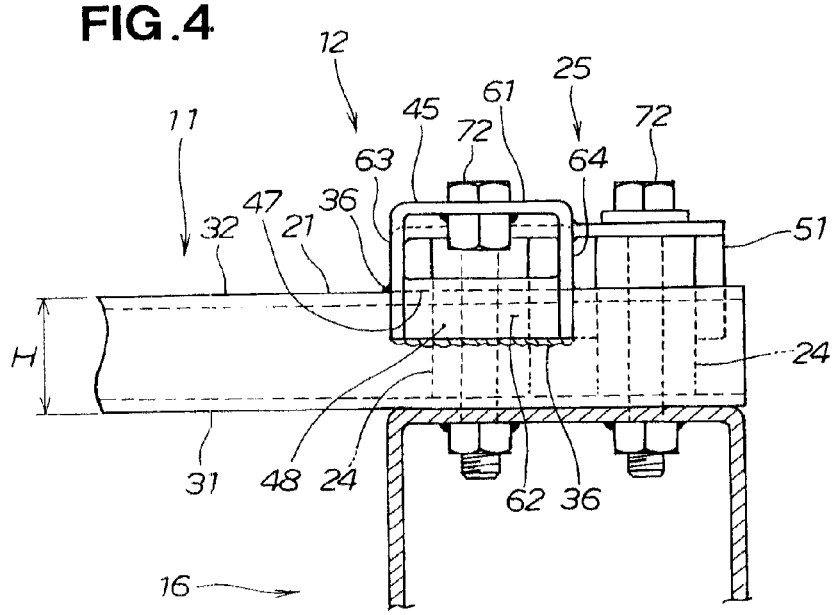
FIG. 4 is a view taken in a direction of arrow 4 of FIG. 2.

As shown in FIG. 3, each of the collars 24 has a cylindrical shape and is inserted through a hole 32*a* formed in the second or upper wall portion 32 of the reinforcing bar 11, and it has projecting welding portions 24*b* formed on the lower surface 24*a* thereof and fixedly joined, by welding (projection welding), to a region of the first or lower wall portion 31 near a bolt inserting hole 31*a* formed in the wall portion 31.

Each of the hook mounting brackets 25 has a fitting groove portion 41 fitted over the reinforcing bar 11, and a projecting reinforcing portion 44 formed integrally with one side (rear side) of the fitting groove portion 41 to extend rearwardly in a longitudinal direction of the corresponding rear side frame 16 and fixedly fastened at its distal (or rear) end portion 43 to the rear side frame 16. The hook mounting bracket 25 also has a hook mounting portion 45 formed integrally with the other side (front side) of the fitting groove portion 41, opposite from the projecting reinforcing portion 44, to extend forward.

More specifically, the fitting groove portion 41 has: a pressing portion 47 having a closed section (closed sectional shape) and abutting against the second or upper wall portion 32 of the reinforcing bar 11; a side portion 48 extending downwardly integrally from the pressing portion 47 to overlap the third and fourth side portions 33 and 34; and a generally L-shaped bulging portion 51 extending integrally from the pressing portion 47.

Figure 2:
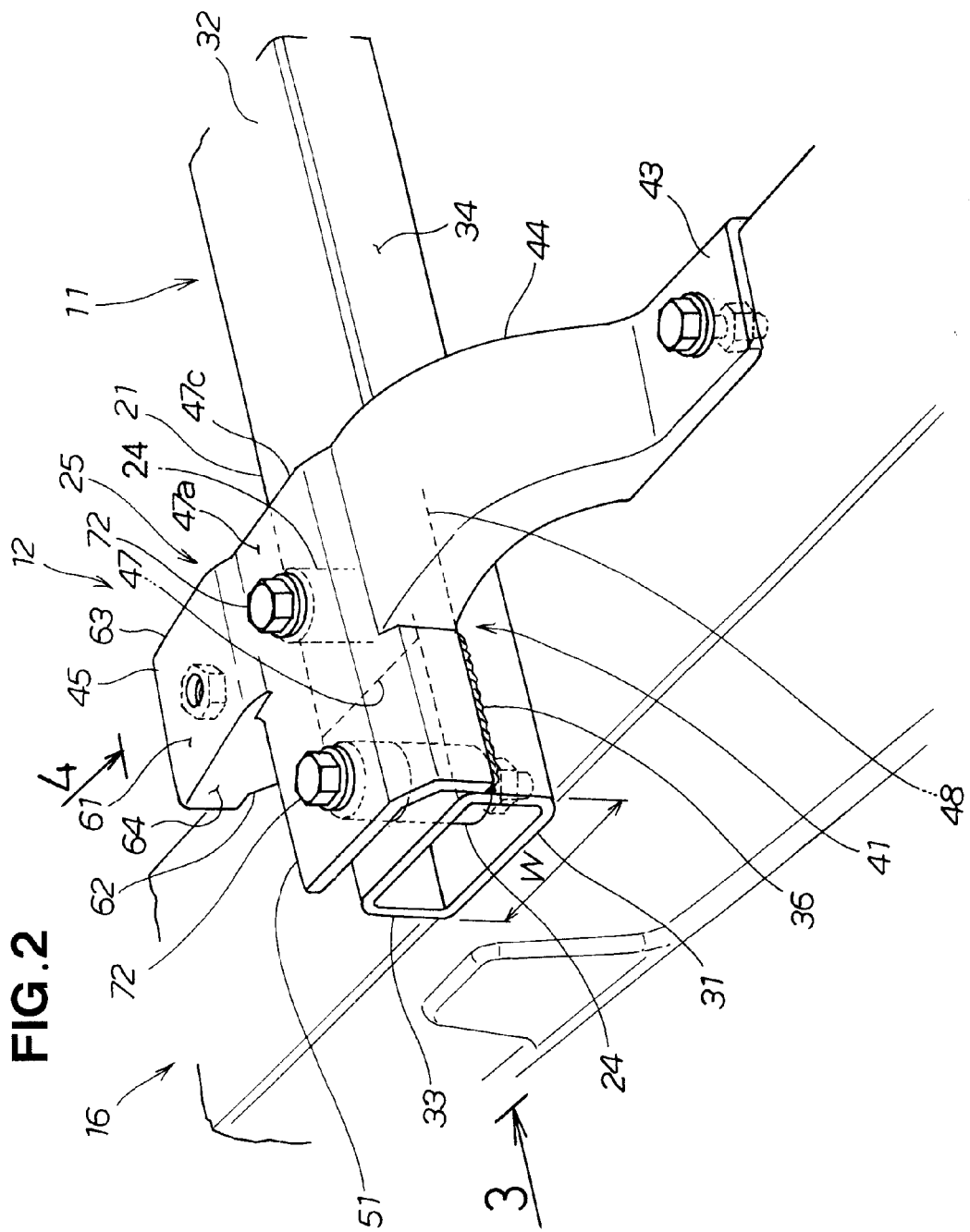
FIG. 2 is an enlarged view of an encircled section 2 of FIG. 1.

The pressing portion 47 has a rectangular closed section (i.e., rectangular closed sectional shape) defined with an upper wall portion 47*a*, lower wall portion 47*b*, inner wall portion 47*c* and outer wall portion 47*d*, as shown in FIGS. 1-3.

The projecting reinforcing portion 44 also has a rectangular closed section defined by respective extensions of the upper wall portion 47*a*, lower wall portion 47*b*, inner wall portion 47*c* and outer wall portion 47*d* of the pressing portion 47.

Figure 5:
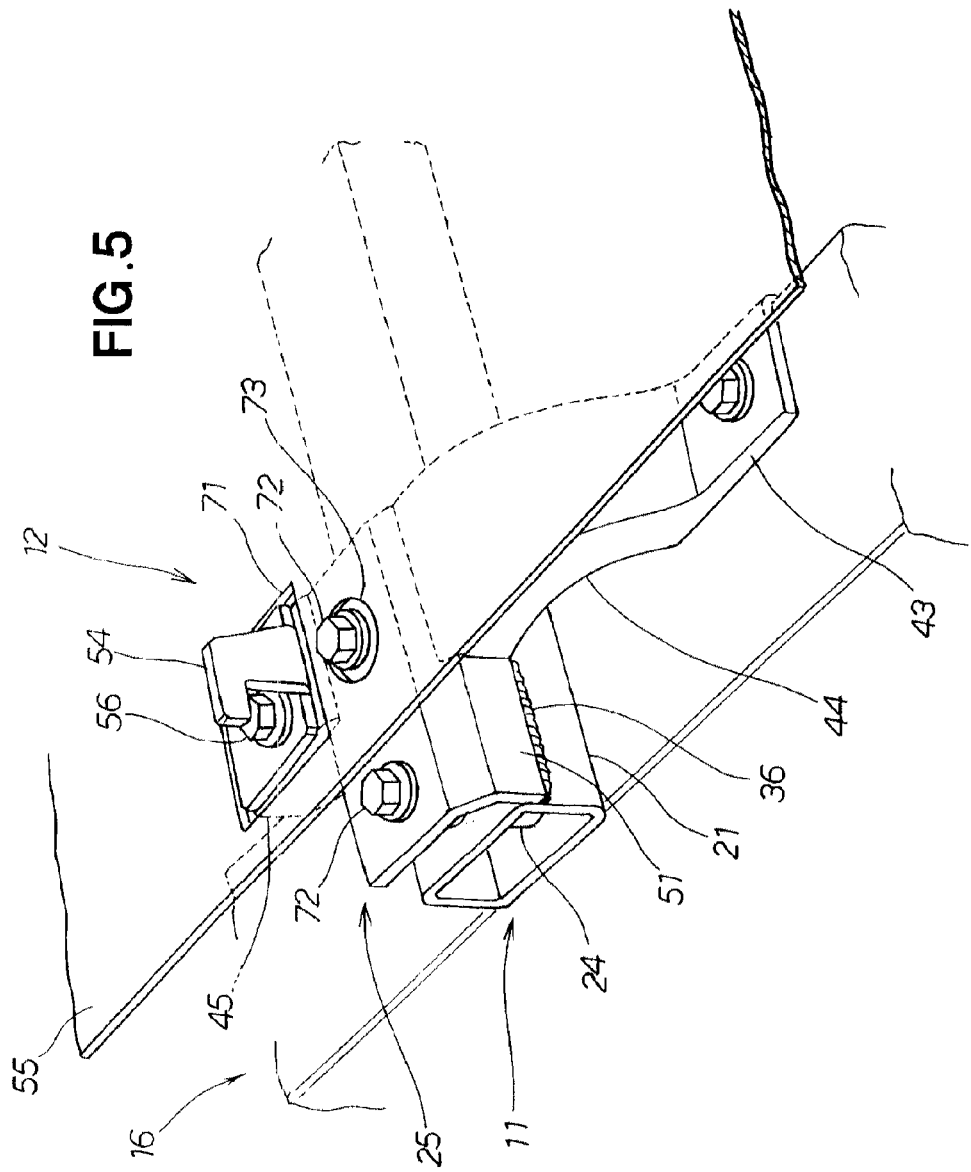
FIG. 5 is a perspective view showing a rear floor lid placed on the reinforcing bar structure and a hook projecting upwardly through the rear floor lid.

The hook mounting portion 45 is also formed in a closed section (closed sectional shape) extending continuously from the closed section of the pressing portion 47 and defined with an upper wall portion 61, lower wall portion 62, inner wall portion 63 and outer wall portion 64. The closed section of the hook mounting portion 45 extends to the side portion 48, and a bolt 56 is passed through the hook mounting portion 45 for mounting a hook 54 of FIG. 5 in such a manner that the hook 54 projects upwardly through a rear floor lid 55.

The rear floor lid 55 is a resin-made thin plate placed on the reinforcing bar structure 12 and closing a rear floor center portion 57 (FIG. 1) of the rear floor panel 18, and it has an opening 71 formed for passage therethrough of the hook 54 and an opening 73 formed for passage therethrough of a head portion of a bolt 72.

Figure 6:
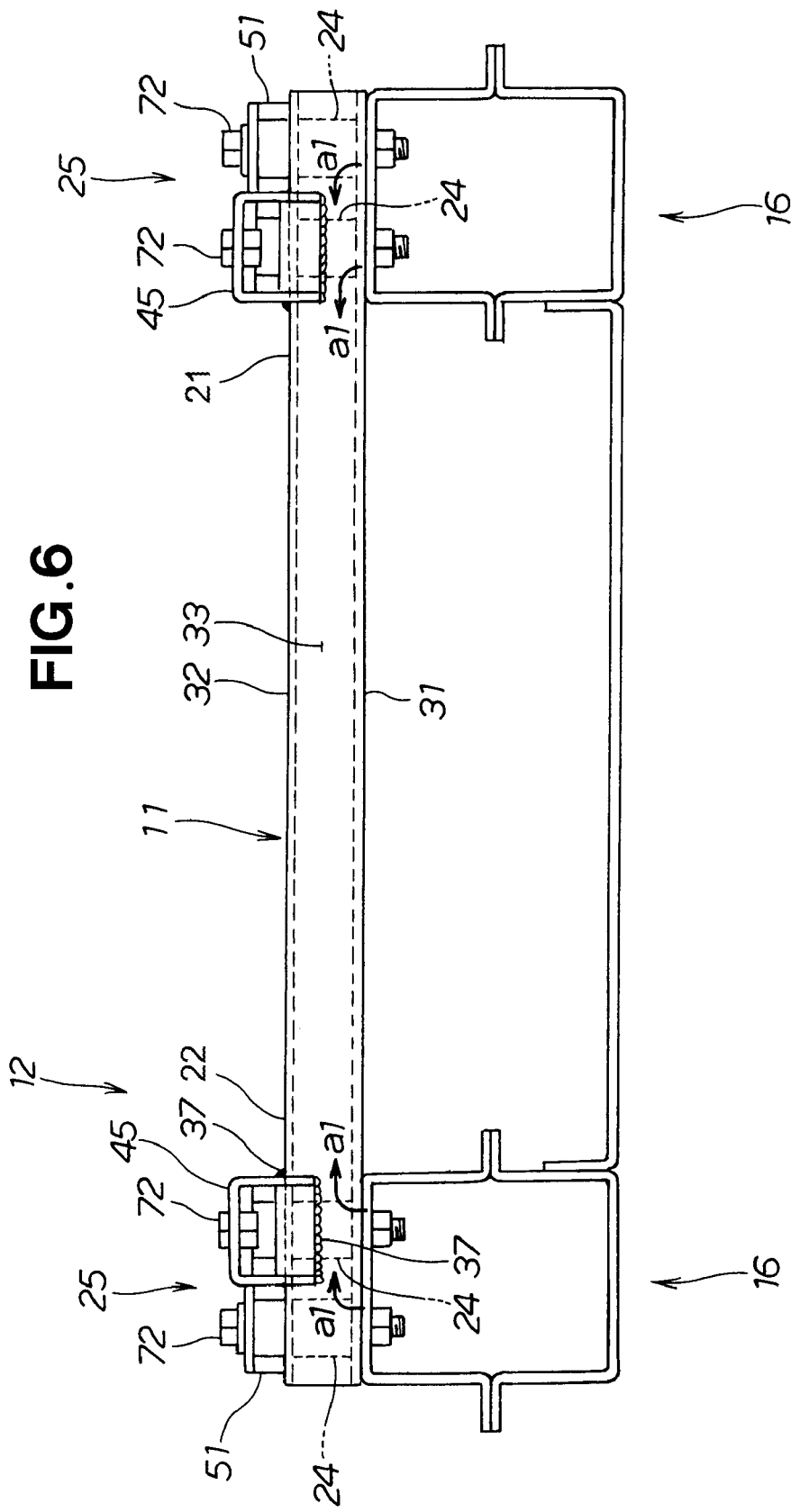
FIG. 6 is a view explanatory of behavior of the first embodiment of the reinforcing bar structure.

With reference to FIG. 6, the following describe behavior of the first embodiment of the reinforcing bar structure 12. For example, once a load is input to the rear side frames (vehicle body frame members) 16 from the rear wheels, the input load is transmitted from the rear side frames 16 to the collars 24 as indicated by arrows a1. Thus, the load can be efficiently transmitted from the rear side frames 16 to the reinforcing bar 11 via the collars 24 as well as the opposite end portions (i.e., first and second fastened portions) 21 and 22 and third and fourth wall portions 33 and 34. In this way, the reinforcing bar structure 12 can achieve an enhanced load transmitting efficiency at the opposite end portions 21 and 22.

Further, in the first embodiment of the reinforcing bar structure 12, the opposite end portions 21 and 22 of the reinforcing bar 11 are each maintained in the closed sectional shape by the provision of the collars 24, and thus, it is possible to freely change the vertical and horizontal dimensions (vertical-to-horizontal ratio) of the section of each of the end portions 21 and 22 as needed according to target performance of the reinforcing bar structure 12. In the context of the present invention, "changing the vertical and horizontal dimensions of the section of each of the end portions 21 and 22" means changing the vertical-to-horizontal ratio of the section.

Further, in the first embodiment of the reinforcing bar structure 12, each of the opposite end portions 21 and 22 of the reinforcing bar 11 is fixedly fastened to the corresponding rear side frame 16 by means of the projecting reinforcing portion 44 provided only on one side of the hook-shaped mounting bracket 25, and thus, the instant embodiment can assemble the reinforcing bar 11 to the rear side frames 16 with an increased ease and can have a reduced weight as compared to a case where each of the hook-shaped mounting brackets 25 has, on the other side as well, a portion similar to the above-mentioned projecting reinforcing portion 44.

Furthermore, because each of the collars 24 is inserted through the hole 32*a* formed in the second or upper wall portion 32 of the reinforcing bar 11 and fixedly joined at its lower portions (projecting welding portions) 24*b*, formed on the lower surface 24*a* of the collar 24, to' a region near the bolt inserting hole 31*a* of the first or lower wall portion 31 by welding (projection welding) as shown in FIG. 3, the instant embodiment of the reinforcing bar structure 12 permits an increased productivity.

Figure 7:
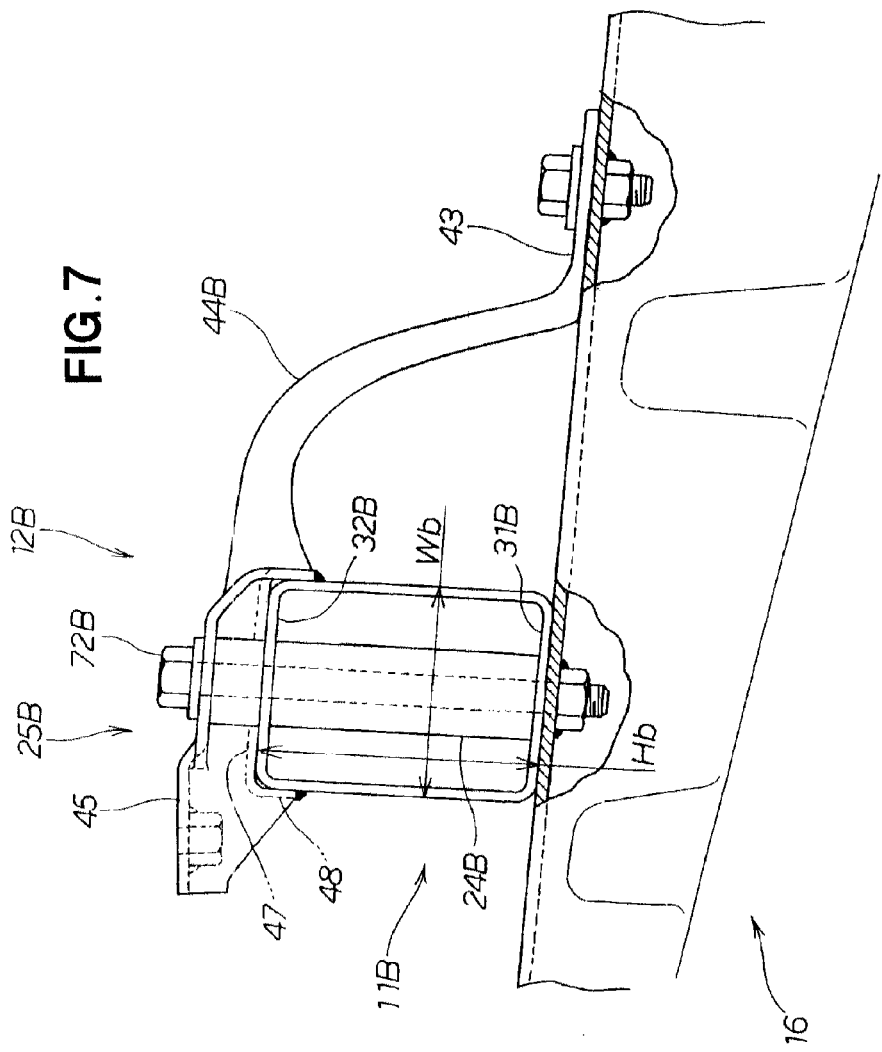
FIG. 7 is a view showing a second embodiment of the vehicular reinforcing bar structure of the present invention.

FIG. 7 is a view, similar to FIG. 3, showing a second embodiment of the reinforcing bar structure 12B, where similar elements to those in the first embodiment of FIGS. 1-6 are indicated by the same reference numerals as used in FIGS. 1-6 and will not be described here to avoid unnecessary duplication.

The second embodiment of the reinforcing bar structure 12B is characterized by a vehicular reinforcing bar 11B, collars 24B and hook mounting brackets 25B.

The vehicular reinforcing bar 11B has a vertical-to-horizontal ratio (height Hb/width Wb) of greater than 1, such as 1.2. Each of the hook mounting brackets 25B has a projecting reinforcing portion 44B of a closed section corresponding to the vertical-to-horizontal ratio of the vehicular reinforcing bar 11B.

The second embodiment of the reinforcing bar structure 12B constructed in the aforementioned manner can behave in the same manner as the first embodiment and thereby achieve the same advantageous benefits as the first embodiment. In addition, the second embodiment of the reinforcing bar structure 12B can achieve an ever further enhanced transmitting efficiency for an input load acting in a vertical (up-down) direction of the vehicle 13.

The reinforcing bar structure of the present invention is well suited for application to rear side frames of vehicles.

Obviously, various minor changes and modifications of the present invention are possible in light of the above teaching. It is therefore to be understood that within the scope of the appended claims the invention may be practiced otherwise than as specifically described.

What is claimed is:

1. A vehicular reinforcing bar structure comprising:
    a reinforcing bar fixedly fastened at opposite end portions thereof to corresponding ones of a pair of opposed vehicle body frame members, the reinforcing bar having a uniform closed sectional shape from one of the end portions to other of the end portions;
    collars fitted in the respective opposite end portions of the reinforcing bar for imparting fastening force to the respective end portions, wherein each of the collars is inserted through a respective hole formed in an upper wall portion of the reinforcing bar and has a lower surface fixedly joined by welding to a lower wall portion of the reinforcing bar; and
    a pair of mounting brackets, wherein each of the mounting brackets fixedly fastens the respective opposite end portion of the reinforcing bar to the respective vehicle body frame member by sandwiching the end portion with the corresponding vehicle body frame member,
    wherein each of the mounting brackets includes a fitting groove portion fitted over the reinforcing bar, a projecting reinforcing portion integrally formed with a first side of the fitting groove portion to extend in a first direction along a longitudinal direction of the corresponding vehicle body frame member and having a distal end portion fixedly fastened to the corresponding vehicle body frame member, and a hook mounting portion integrally formed with a second side of the fitting groove portion, opposite from the projecting reinforcing portion to extend in a second direction that is opposite to the first direction, and
    wherein the fitting groove portion has a pressing portion having a closed sectional shape and abutting against the upper wall portion of the reinforcing bar, each of the respective collars is inserted through the respective hole of the upper wall portion of the reinforcing bar to extend through the closed sectional shape of the fitting groove portion and includes an upper surface that is in contact with an upper wall portion of the pressing portion.

2. The vehicular reinforcing bar structure of claim 1, wherein the closed sectional shape of the reinforcing bar is a rectangular closed sectional shape.

3. The vehicular reinforcing bar structure of claim 1, further comprising:
    a hook that extends through a rear floor lid, wherein the hook is mounted on the hook mounting portion so that the hook mounting portion is disposed between the hook and the respective vehicle body frame member.

4. The vehicular reinforcing bar structure of claim 3, wherein the hook mounting portion defines a bolt hole for receipt of a bolt to attach the hook to the hook mounting portion.

5. The vehicular reinforcing bar structure of claim 3, wherein the hook is vertically offset from the respective vehicle body frame member a distance that is greater than a vertical distance from the respective vehicle body frame member to the reinforcing bar.

* * * * *